United States Patent
Metschke (12)

(10) Patent No.: US 10,802,510 B2
(45) Date of Patent: Oct. 13, 2020

(54) RELAY VALVE AND FORCE BALANCING METHOD

(71) Applicant: FISHER CONTROLS INTERNATIONAL LLC, Marshalltown, IA (US)

(72) Inventor: Christopher S. Metschke, Ames, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 0 days.

(21) Appl. No.: 16/146,379

(22) Filed: Sep. 28, 2018

(65) Prior Publication Data

US 2019/0101943 A1   Apr. 4, 2019

Related U.S. Application Data

(60) Provisional application No. 62/565,960, filed on Sep. 29, 2017.

(51) Int. Cl.

| | |
|---|---|
| *G05D 16/20* | (2006.01) |
| *F16K 31/126* | (2006.01) |
| *F15B 13/043* | (2006.01) |
| *F16K 31/122* | (2006.01) |
| *F15B 13/04* | (2006.01) |

(52) U.S. Cl.
CPC ..... *G05D 16/2093* (2013.01); *F15B 13/0405* (2013.01); *F15B 13/0433* (2013.01); *F16K 31/122* (2013.01); *F16K 31/1268* (2013.01)

(58) Field of Classification Search
CPC ............ G05D 16/2093; F15B 13/0405; F15B 13/0433; F16K 31/1268; F16K 31/122; Y10T 137/1026; Y10T 137/87225

USPC ............................................. 137/102, 596.18
See application file for complete search history.

(56) References Cited

U.S. PATENT DOCUMENTS

| | | | | |
|---|---|---|---|---|
| 2,286,282 | A | * | 6/1942 | Joesting ................. F04B 49/00 137/636.1 |
| 3,385,319 | A | * | 5/1968 | Myers ..................... F16K 11/22 137/596.18 |
| 3,477,465 | A | * | 11/1969 | Town .................. F15B 13/0405 137/596.18 |

(Continued)

FOREIGN PATENT DOCUMENTS

| | | |
|---|---|---|
| EP | 1 291 532 A2 | 3/2003 |
| GB | 2 004 030 A | 3/1979 |
| JP | 2002250465 A | 9/2002 |

OTHER PUBLICATIONS

English Translation of EP 1 291 532 A2 (ASCO Joucomatic [Fr]) dated Mar. 12, 2003 (Year: 2003).*

(Continued)

*Primary Examiner* — William M Mccalister
(74) *Attorney, Agent, or Firm* — Marshall, Gerstein & Borun LLP (57) ABSTRACT

A relay valve configured according to the various embodiments as described herein advantageously provides consistent, reliable start point pressures for both supply and exhaust functionalities. To achieve this, the relay valves described herein utilize a plurality of diaphragms to neutralize any variable forces due to pressure in an actuator and, optionally, a supply connected to the relay valve.

18 Claims, 7 Drawing Sheets

(56) References Cited

U.S. PATENT DOCUMENTS

| | | | | |
|---|---|---|---|---|
| 3,580,538 | A | * 5/1971 | Wyrick | F15B 13/16 |
| | | | | 251/29 |
| 3,646,969 | A | 3/1972 | Stampfli | |
| 4,117,706 | A | * 10/1978 | Lami | B21B 37/38 |
| | | | | 137/102 |
| 5,443,087 | A | * 8/1995 | Myles | G05D 16/2093 |
| | | | | 137/14 |
| 5,682,918 | A | * 11/1997 | Stoll | G05D 16/0663 |
| | | | | 137/85 |
| 8,205,632 | B2 | * 6/2012 | Fishwick | F15B 13/0405 |
| | | | | 137/102 |
| 2007/0045579 | A1 | * 3/2007 | Wirtl | G05D 16/163 |
| | | | | 251/129.04 |
| 2012/0248363 | A1 | * 10/2012 | Inagaki | F16K 31/1268 |
| | | | | 251/321 |

OTHER PUBLICATIONS

Search Report and Written Opinion for International Application No. PCT/US2018/052601, dated Jan. 25, 2019.

* cited by examiner

RELAY VALVE AND FORCE BALANCING METHOD

CROSS REFERENCE TO RELATED APPLICATION

This application claims the benefit of U.S. Provisional Application No. 62/565,960, filed Sep. 29, 2017, which is hereby incorporated by reference herein in its entirety.

FIELD OF THE DISCLOSURE

The present disclosure generally relates to pneumatic valves and, more particularly, to pneumatic relay valves.

BACKGROUND

Relay valves can be utilized in systems to receive an air mass flow, such as from an I/P converter, and, in response, output a larger air mass flow to an actuator. This type of relay valve can have an inherent deadtime during operation that corresponds to the time when the I/P converter is first operated and when the larger air mass flow beings to flow out of the relay valve. Some actuators require accurate pulses of air out of the relay valve and the inherent deadtime of the system can influence the accuracy of the pluses of air. If the deadtime is not consistent, fine control movements can become erratic.

One source of variation in the deadtime can come from the areas of the exhaust and supply ports within the relay valve and changes in pressure from the actuator and/or supply. The pressure(s), in combination with the areas, apply forces on the valve seats sealing the exhaust and/or supply ports. If these values change due to fluctuating pressures, a different pressure is required from the I/P converter to open the relay valve, which results in a change of deadtime.

SUMMARY

In some embodiments, a relay valve is described herein that includes a housing with an exhaust chamber, a supply chamber coupled to a supply, an actuator chamber coupled to an actuator, an exhaust port connecting the exhaust chamber to the actuator chamber, a supply port connecting the supply chamber to the actuator chamber, and an I/P chamber coupled to an I/P converter. The relay valve further includes a stack having a first end, a second end, and a valve seat portion where the stack is configured to be shifted within the housing to thereby control opening and closing of one of the exhaust port or supply port with the valve seat portion thereof. A spring of the relay valve is configured to apply a force on the first end of the stack, while an I/P diaphragm mounted within the housing to extend across the I/P chamber is configured to apply a force on the second end of the stack based on pressure provided by the I/P converter. The relay valve further includes an actuator diaphragm mounted within the housing and coupled to the stack where the actuator diaphragm is disposed on an opposite side of the actuator chamber as the one of the exhaust port or supply port and wherein an area of the actuator diaphragm is generally equal to an area of the one of the exhaust port or supply port such that forces acting on the stack due to pressure within the actuator chamber acting on the valve seat portion and the actuator diaphragm cancel one another out.

In some approaches, the stack can be a supply stack that is configured to be shifted within the housing to thereby control opening and closing of the supply port with the valve seat portion thereof. These approaches can further include providing a supply diaphragm mounted within the housing and coupled to the supply stack. where the supply diaphragm is disposed on an opposite side of the supply chamber as the supply port, and where an area of the supply diaphragm is generally equal to an area of the supply port such that forces acting on the supply stack due to pressure within the actuator chamber acting on the valve seat portion and the actuator diaphragm cancel one another out.

In other approaches, the stack can be an exhaust stack that is configured to be shifted within the housing to thereby control opening and closing of the exhaust port with the valve seat portion thereof. These approaches can further include providing a supply stack having a first end, a second end, and a valve seat portion where the supply stack is configured to be shifted within the housing to thereby control opening and closing of the supply port with the valve seat portion thereof. With this configuration, the actuator diaphragm can be a first actuator diaphragm, the I/P diaphragm can be a first I/P diaphragm, the spring can be a first spring; the I/P chamber can be an I/P exhaust chamber; and the housing further includes an I/P supply chamber coupled to a supply I/P converter, where the relay valve further includes a second spring configured to apply a force on the first end of the supply stack, a second I/P diaphragm mounted within the housing to extend across the supply I/P chamber, the second I/P diaphragm configured to apply a force on the second end of the supply stack based on pressure provided by the supply I/P converter, and a second actuator diaphragm mounted within the housing and coupled to the supply stack, the second actuator diaphragm disposed on an opposite side of the actuator chamber as the supply port.

In several aspects, the stack can include an I/P member disposed within the I/P chamber of the housing and a valve rod member having a first end, a second end, and the valve seat portion, where the second end of the valve rod and the I/P member engage one another on either side of the I/P diaphragm.

In some embodiments, a relay valve is described herein that includes a housing with an exhaust chamber, a supply chamber coupled to a supply, an actuator chamber coupled to an actuator, an exhaust port connecting the exhaust chamber to the actuator chamber, and a supply port connecting the supply chamber to the actuator chamber. The relay valve further includes an exhaust stack having a valve seat portion and being configured to be shifted within the housing to thereby control opening and closing of the exhaust port with the valve seat portion thereof, and a supply stack having a valve seat portion and being configured to be shifted within the housing to thereby control opening and closing of the supply port with the valve seat portion thereof. A first actuator diaphragm of the relay valve is mounted within the housing and coupled to the exhaust stack. The first actuator diaphragm is disposed on an opposite side of the actuator chamber as the exhaust port and an area of the first actuator diaphragm is generally equal to an area of the exhaust port such that forces acting on the exhaust stack due to pressure within the actuator chamber acting on the valve seat portion and the first actuator diaphragm cancel one another out. A second actuator diaphragm of the relay valve is mounted within the housing and coupled to the supply stack. The second actuator diaphragm is disposed on an opposite side of the actuator chamber as the supply port and an area of the second actuator diaphragm is generally equal to an area of the supply port such that forces acting on the supply stack due to pressure within the actuator chamber acting on the valve seat portion and the second actuator diaphragm cancel one another out.

In some aspects, the first actuator diaphragm and the second actuator diaphragm are portions of a single diaphragm. In other aspects, the relay valve can further include a supply diaphragm mounted within the housing and coupled to the supply stack where the supply diaphragm is disposed on an opposite side of the supply chamber as the supply port and an area of the supply diaphragm is generally equal to an area of the supply port such that forces acting on the supply stack due to pressure within the supply chamber acting on the valve seat portion and the supply diaphragm cancel one another out.

By several approaches, the housing can include first and second I/P chambers coupled to first and second I/P converters, second ends of the exhaust and supply stacks being disposed within the first and second I/P chambers. The relay valve can further include an I/P diaphragm that includes first and second portions extending across the first and second I/P chambers where the first and second portions are configured to apply a force on the second ends of the exhaust and supply stacks, respectively, based on pressure provided by the respective I/P converter. The relay valve can further include a first spring disposed within the housing and configured to apply a force on the first end of the exhaust stack and a second spring disposed within the housing and configured to apply a force on the first end of the supply stack.

In some embodiments, any of the relay valves described herein can be incorporated into a system that includes first and second I/P converters coupled to the relay valve and an actuator coupled to the relay valve. In further embodiments, the system can further include a controller coupled to the first and second I/P converters and configured to receive feedback from the actuator.

In several embodiments, a method for operating a relay valve is described herein where the relay valve includes a housing including an exhaust chamber, a supply chamber coupled to a supply, an actuator chamber coupled to an actuator, an exhaust port connecting the exhaust chamber to the actuator chamber, a supply port connecting the supply chamber to the actuator chamber, and an I/P chamber coupled to an I/P converter. The method includes applying a first force on a first end of a stack disposed within the housing and configured to be shifted therein to thereby control opening and closing of the exhaust port or supply port with a valve seat portion thereof, applying a second force on the valve seat portion of the stack based on pressure within the actuator chamber, applying a third force on the stack having a magnitude generally equal to the second force in an opposite direction thereof with an actuator diaphragm disposed across a portion of the actuator chamber to thereby negate the impact of the second force on the stack, receiving an input pressure from the I/P converter in the I/P chamber, and applying a fourth force on a second end of the stack with an I/P diaphragm disposed across the I/P chamber based on the input pressure to thereby control shifting of the stack.

By some approaches, the stack is a supply stack configured to be shifted within the housing to thereby control opening and closing of the supply port with the valve seat portion thereof. In these approaches, the method can further include applying a fifth force on the valve seat portion of the supply stack based on pressure within the supply chamber and applying a sixth force on the supply stack having a magnitude generally equal to the fifth force in an opposite direction thereof with a supply diaphragm disposed across a portion of the supply chamber to thereby negate the impact of the fifth force on the supply stack.

By other approaches, the stack is an exhaust stack configured to be shifted within the housing to thereby control opening and closing of the exhaust port with the valve seat portion thereof. In these approaches, the I/P chamber can be a first I/P chamber, the actuator diaphragm can be a first actuator diaphragm, and the housing can further includes a second I/P chamber coupled to a second I/P converter. With this configuration, the method can further include applying a first force on a first end of a supply stack disposed within the housing and configured to be shifted therein to thereby control opening and closing of the supply port with a valve seat portion thereof, applying a second force on the valve seat portion of the supply stack based on pressure within the actuator chamber, applying a third force on the supply stack having a magnitude generally equal to the second force in an opposite direction thereof with a second actuator diaphragm disposed across a portion of the actuator chamber to thereby negate the impact of the second force on the supply stack, receiving an input pressure from the second I/P converter in the second I/P chamber, and applying a fourth force on a second end of the supply stack with a second I/P diaphragm disposed across the second I/P chamber based on the input pressure from the second I/P converter to thereby control shifting of the supply stack.

BRIEF DESCRIPTION OF THE DRAWINGS

The above needs are at least partially met through provision of the methods, relay valves, systems, and components thereof described in the following detailed description, particularly when studied in conjunction with the drawings, wherein.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

Figure 1:
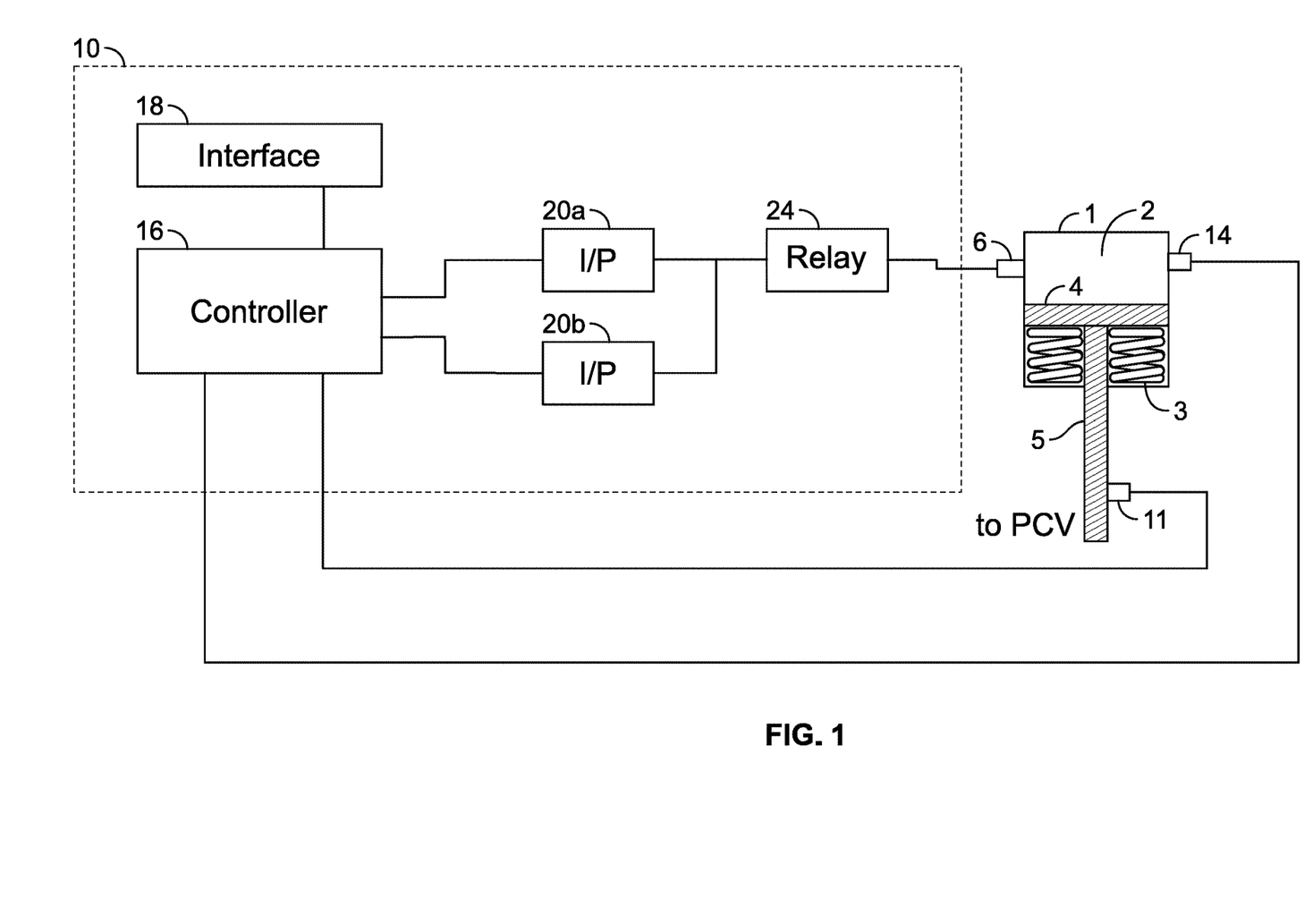
FIG. 1 is a block diagram of an example implementation of a valve positioning system, including a spring return pneumatic actuator, in accordance with various embodiments of the present disclosure.

A relay valve configured according to the various embodiments as described herein advantageously provides consistent, reliable start point pressures for both supply and exhaust functionalities. To achieve this, the relay valves described herein utilize a plurality of diaphragms to neutralize any variable forces due to pressure in an actuator and, optionally, a supply connected to the relay valve.
Example Control Valve Positioning Systems FIG. 1 is a block diagram of an example implementation of a valve positioning system comprising an actuator 1 for opening and closing a process control valve (PCV). In the implementation of FIG. 1, the actuator 1 may be a spring return pneumatic actuator.

In some implementations, the positioner 10 may configured to include some or all of the advanced functionality of a digital valve controller (DVC), though FIG. 1 does not illustrate this functionality. The actuator 1 may comprise a pneumatic chamber 2 and a spring 3, which may be separated by a piston 4. Addition of pneumatic pressure to the pneumatic chamber 2 may cause movement of the piston 4, which may in turn cause movement of a stem 5 connected to the piston 4. Conversely, removal of pneumatic pressure from the pneumatic chamber 2 may cause opposite movement of the piston 4 and the stem 5. Collectively, the movement of the stem 5 (e.g., linear or angular displacement of the stem 5) may open or close the process control valve through which process fluid may flow. The process control valve may control fluid flow within a process control system, such as a chemical or other process control plant.

An supply/exhaust port 6 may supply air or other control fluid to the pneumatic chamber 2, and/or conversely, may exhaust control fluid from the pneumatic chamber 2. In some embodiments, the supply/exhaust port 6 may comprise separate ports for supply and exhaust of control fluid to the pneumatic chamber 2. Addition or removal of control fluid to the pneumatic chamber 2 may increase or decrease, respectively, the pneumatic pressure in the pneumatic chamber 2, consequently causing a change in actuator position and thus a change in process fluid flow through the process fluid valve.

In some implementations, the actuator 1 may additionally include a fail-safe spring (not pictured) in the pneumatic chamber 2. Such a spring may place an actuator at one limit of the actuators range when, for example, the chamber 2 depressurizes due to a control fluid leak.

In some implementations, a mechanism in an alternative actuator 1 may translate the linear motion of the piston 4 into rotary motion of the stem 5 by means of rack and pinion, scotch yoke, or another mechanism.

A position sensor 11 may be configured to detect the position of the actuator 1, for example, by detecting linear displacement of the stem 5. In implementations with an alternative rotary actuator, an alternative position sensor 11 may be configured to measure angular displacement of some portion of the alternative rotary actuator. A pressure sensor 14 may be configured to detect an amount of pneumatic pressure in the pneumatic chamber 2. In some implementations, the pressure sensor 14 may be located at an outlet port of the chamber 2. Additionally or alternatively, the pressure sensor 14 may be integrated into the body of the positioner 10, and connected to chamber 2 via a pneumatic line. In any case, the position sensor 11 and pressure sensor 14 may be communicatively connected to a controller 16 to provide feedback of observed actuator position and pressure to the controller 16.

The controller 16 may include wired and/or wireless connections, circuitry for communications and signal processing, non-transient memory and/or a human-machine interface. In an example implementation, the controller 16 includes processing software such as a microprocessor and a computer-readable memory to store software instructions. The controller 16 may be configured to receive position feedback from the position sensor 11, and/or pressure feedback from the pressure sensor 14. Generally, the controller 16 may be configured to use the received feedback to execute a control algorithm to control position of the actuator 1. In some implementations, the controller may comprise one or more microprocessors. In other implementations, the controller 16 may comprise field programmable gate arrays (FPGAs) or analog circuits. The controller 16 may be configured to execute the control algorithm (e.g., a Multiple Input Multiple Output (MIMO) control algorithm) to output electrical control signals to respective current-to-pressure (I/P) transducers 20a and 20b for generating pneumatic signals for the actuator 1. The controller 16 may additionally be configured to compute other signals, such as diagnostic information about the positioner and the actuator. The positioner 10 may additionally comprise an interface 18 communicatively coupled to the controller 16. In some embodiments, the interface 18 may communicate actuator control constraints, process variable set points, and/or other information, that may be defined by a human operator and/or a control algorithm.

The controller 16 may output electrical signals for controlling the actuator 1, the electrical signals transmitted to the I/P transducers 20a and 20b, which may be connected to a pneumatic relay 24 which may amplify the flow rates specified via the transducers 20a and 20b (as will be described further herein, e.g., with regard to FIG. 3). Electrical signals transmitted to the I/P transducer 20a may correspond to the supply of pressurized control fluid to the pneumatic chamber 2, while signals transmitted to the transducer 20b may correspond to exhaust of control fluid from the chamber 2. The pneumatic relay 24 may amplify the pneumatic signals generated via the transducers 20a and 20b to supply or exhaust pressure from the pneumatic chamber 2 via the supply/exhaust port 6.

Figure 2:
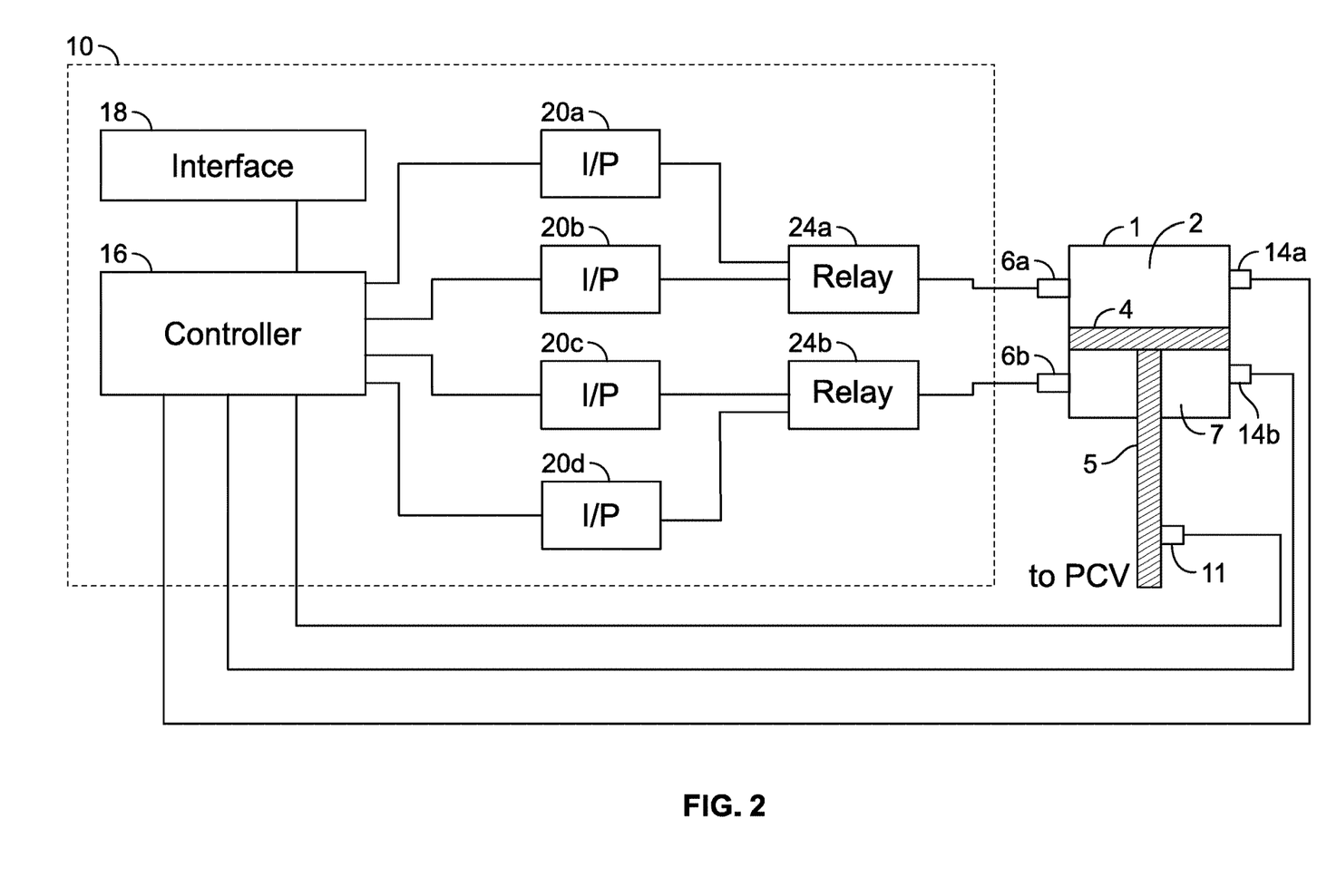
FIG. 2 is a block diagram of an alternative implementation of the valve positioning system of FIG. 1, including a double acting pneumatic actuator, in accordance with various embodiments of the present disclosure.

FIG. 2 is a block diagram of an alternative implementation of the valve positioning system of FIG. 1. In the FIG. 2 implementation, a double-acting pneumatic actuator 1 replaces the spring return pneumatic actuator 1 of FIG. 1. The double-acting pneumatic actuator 1 includes an upper pneumatic chamber 2 and a lower pneumatic chamber 7. The valve positioning system of FIG. 2 may operate similarly to the system described with regard to FIG. 1, apart the differences described herein.

The upper pneumatic chamber 2 and lower pneumatic chamber 7 may be separated by the piston 4. A pressure differential between the chambers 2 and 7 may cause movement of the piston 4, which in turn may cause movement of the stem 5, thus opening or closing the process control valve and affecting process fluid flow.

Supply/exhaust ports 6a and 6b may supply and/or exhaust control fluid from the upper chamber 2 and lower chamber 7, respectively. As the amount of control fluid changes in either or both of the chambers 2 and 7, a control fluid pressure differential in the chambers 2 and 7 may cause positional movement of the piston 4 and stem 5 to partially or fully open or close the control valve. In some embodiments, either or both of the supply/exhaust ports 6a and 6b may comprise separate ports for supply and exhaust of control to the respective chambers 2 and 7.

In some implementations, the double-acting actuator 1 may include a spring (not shown) in one or both of the chambers 2 and 7 for fail-open or fail-closed action. Such a spring may place an actuator at one limit of the actuators range when, for example, either of the chambers 2 and 7 depressurize due to a leak.

A pair of pressure sensors 14a and 14b may be configured to detect an amount of pneumatic pressure in the upper pneumatic chamber 2 and lower pneumatic chamber 7, respectively. In some implementations, the pressure sensors 14a and 14b may be located at outlet ports of the respective chambers 2 and 7. Additionally or alternatively, the pressure sensors 14a and 14b may be integrated into the body of the positioner 10, and connected to the respective chambers 2 and 7 via pneumatic lines. In any case, the position sensor 11 and pressure sensors 14a and 14b may be communicatively connected to the controller 16 to provide feedback of observed actuator position and pressure to the controller 16.

The controller 16 may be a similar controller to that described regarding the FIG. 1 implementation. The controller 16 may be configured to execute a control algorithm (e.g., a MIMO control algorithm) to output electrical control signals to I/P transducers 20a-20d. Electrical signals transmitted to the I/P transducer 20a may correspond to the supply of pressurized control fluid to the upper pneumatic chamber 2, while signals transmitted to the transducer 20b may correspond to exhaust of control fluid from the upper chamber 2. Electrical signals transmitted to the I/P transducer 20c may correspond to the supply of pressurized control fluid to the lower pneumatic chamber 7, while signals transmitted to the transducer 20d may correspond to exhaust of control fluid from the lower chamber 7. A pneumatic relay 24 may amplify the pneumatic signals generated via the transducers 20a and 20b to supply or exhaust pressure from the upper pneumatic chamber 2 via the supply/exhaust port 6a. Similarly, a pneumatic relay 24 may amplify the pneumatic signals generated via the transducers 20c and 20d to supply or exhaust pressure from the lower pneumatic chamber 7 via the supply/exhaust port 6b.

Figure 3:
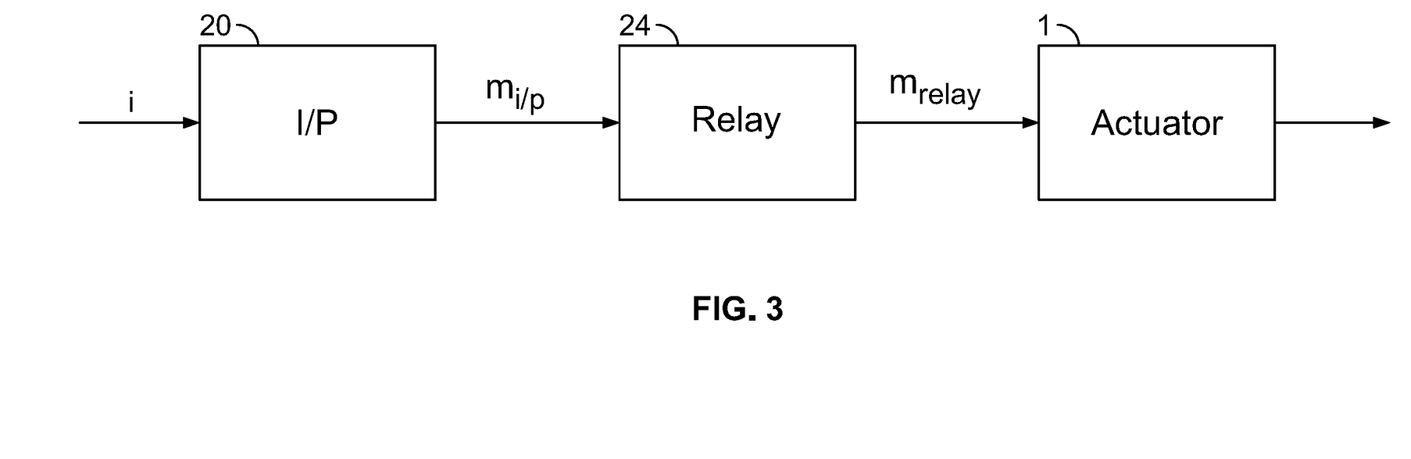
FIG. 3 is a focused block diagram including a pneumatic relay valve in accordance with various embodiments of the present disclosure.

FIG. 3 is a more focused block diagram including a pneumatic relay 24 in accordance with various embodiments of the present disclosure. The components illustrated in FIG. 3 may be included, for example, in the valve positioning systems described with regard to FIG. 1 and FIG. 2.

An electrical control signal (current 0 may be supplied to the I/P transducer 20. The I/P transducer 20 receives the control signal and outputs a small air mass flow ($m_{i/p}$) to the pneumatic relay 24. This small air mass flow may pressurize a diaphragm chamber in the relay 24, which opens a relay valve in the relay 24. When the relay valve is opened, a larger air mass flow ($m_{relay}$) may flow from the relay 24 to the actuator 1 (e.g., via a supply/exhaust port of the actuator 1 to pressurize or depressurize a pneumatic chamber of the actuator 1.

A deadtime may correspond to a period of time that is present between a first time at which current i is first supplied to the I/P transducer 20, and a second, subsequent time at which the air mass flow $m_{relay}$ begins to flow out of the pneumatic relay 24. Inconsistent deadtime in a valve positioner may cause fine control movements (e.g., actuator position movements) to become erratic. Inconsistency in deadtime may be caused, for example, via an unbalanced area of a supply port and exhaust port of the pneumatic relay, as will be described with regard to FIGS. 4-8.

Force Balancing in a Relay Valve Via Diaphragm(S)

Figure 4:
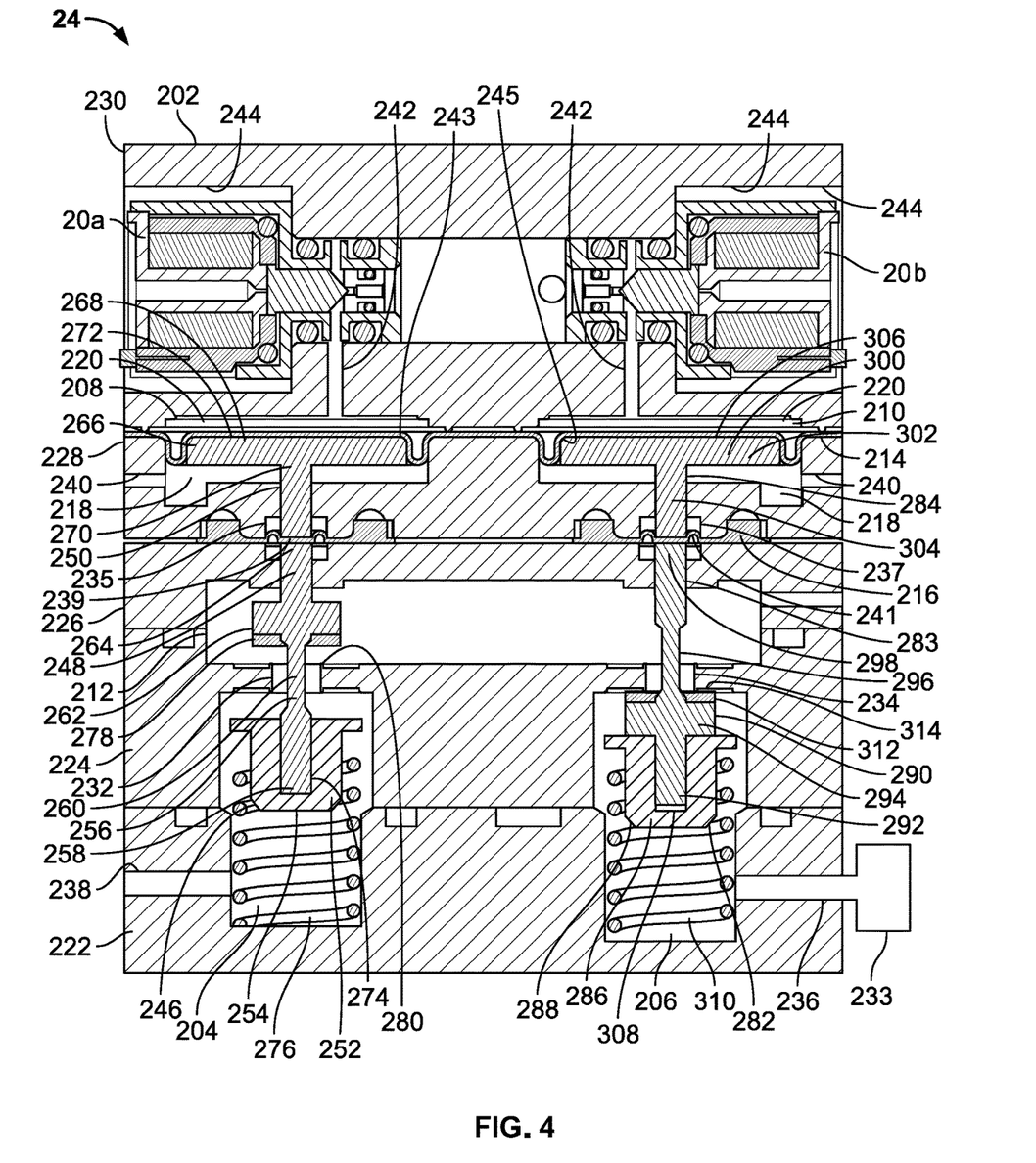
FIG. 4 is a first embodiment of a relay valve in accordance with various embodiments of the present disclosure.

With reference to FIG. 4, a relay valve 24 in a first form is shown. The relay valve 24 includes a housing 202 having an exhaust chamber 204, a supply chamber 206, a first I/P chamber 208, a second I/P chamber 210, and an actuator chamber 212. The relay valve 24 further includes an I/P diaphragm 214 and an actuator diaphragm 216. The I/P diaphragm 214 divides the first and second I/P chambers 208, 210 into a vented portion 218 and a pressurized portion 220.

In the illustrated form, the housing 202 has a five piece, multi-part construction including first 222, second 224, third 226, fourth 228, and fifth 230 portions. The first and second portions 222, 224 define the exhaust and supply chambers 204, 206 therebetween. The second and third portions 224, 226 define the actuator chamber 212 therebetween and the second portion 224 includes an exhaust port 232 connecting the actuator chamber 212 to the exhaust chamber 204 and a supply port 234 connecting the actuator chamber 212 to the supply chamber 206. The actuator diaphragm 216 is disposed between the third and fourth portions 226, 228 to thereby seal the actuator chamber 212. The third and fourth portions 226, 228 define first and second actuator diaphragm chambers 235, 237, having first and second portions 239, 241 of the actuator diaphragm 216 extending thereacross with pressure from the actuator on one side thereof and atmosphere on the other side thereof. The chambers 235, 237 can be generally cylindrical so that the first and second portions 239, 241 of the actuator diaphragm 216 are generally circular. Of course, all actuators/actuator portions described herein can be configured as commonly understood with excess material to allow the diaphragm/diaphragm portion to flex in either direction. The fourth and fifth portions 228, 230 define the first and second I/P chambers 208, 210 and capture the I/P diaphragm 214 therebetween. First and second portions 243, 245 of the I/P diaphragm extend across the first and second I/P chambers 208, 210. As such, the vented portions 218 of the first and second I/P chambers 208, 210 are defined by the fourth portion 230 and the I/P diaphragm 214 and the pressurized portions 220 are defined by the fifth portion 230 and the I/P diaphragm 214.

The supply chamber 206 is coupled to and receives pressurized gas from a supply 233 via a suitable connection/port 236. The exhaust chamber 204 includes a vent 238 open to atmosphere. The vented portions 218 of the first and second I/P chambers 208, 210 includes vents 240 open to atmosphere and the pressurized portions 220 thereof are coupled to first and second I/P converters 20a, 20b, respectively, via suitable passages or ports 242, to thereby receive pressurized gas and exhaust gas. If desired, the housing 202 can include cavities or mounts 244 to receive the first and second I/P converters 20a, 20b therein.

As shown in FIG. 4, the relay valve 24 further includes an exhaust stack 246 that extends from the exhaust chamber 204, through the exhaust port 232 and the actuator chamber 212, and to the vented portion 218 of the first I/P chamber 208 through passages 248, 250 extending from the actuator chamber 212 to the first I/P chamber 208. The exhaust stack 246 includes a cup-shaped member 252 at a first end 254 thereof; an intermediate valve rod 256 having a first end 258, a narrowed portion 260 extending through the exhaust port 232, a valve seat portion 262, and a second end 264; and an I/P member 266 having a disc-shaped portion 268 and a rod portion 270 at a second end 272 thereof. The first end 254 of the intermediate valve rod 252 is configured to mount or couple to the cup-shaped member 248, such as by extending into a cavity 274 thereof, and the second end 264 engages the rod portion 270 of the I/P member 266 through the I/P diaphragm 214.

The exhaust stack 246 engages a first spring 276 with the first end 254 thereof. So configured, the first spring 276 applies a force on the first end 254 of the exhaust stack 246. The first portion 243 of the I/P diaphragm 214, due to pressure in the first I/P chamber 208, provides a counter force to the second end 272 thereof. By a first approach, controlling the pressure in the I/P chamber 208 to apply a larger force on the second end 272 than the spring force causes an annular seat member 278 of the valve seat portion 262 to engage a lip or rim 280 of the exhaust port 232 to thereby seal the actuator chamber 212 against venting through the exhaust chamber 204. By a similar, second approach, controlling the pressure in the first I/P chamber 208 to apply a smaller force on the second end 272 than the spring force causes the annular seat member 278 of the valve seat portion 262 to disengage from the lip 280 of the exhaust port 232 causing pressure within the actuator chamber 212 to vent through the exhaust port 232 to the exhaust chamber 204.

As shown in FIG. 4, the relay valve 24 further includes a supply stack 282 having a configuration similar to the exhaust stack 246. The supply stack 282 extends from the supply chamber 206, through the supply port 234 and the actuator chamber 212, and to the vented portion 218 of the second I/P chamber 210 through passages 283, 284 extending from the actuator chamber 212 to the second I/P chamber 210. The supply stack 282 includes a cup-shaped member 286 at a first end 288 thereof; an intermediate valve rod 290 having a first end 292, a valve seat portion 294, a narrowed portion 296 extending through the supply port 234, and a second end 298; and an I/P member 300 having a disc-shaped portion 302 and a rod portion 304 at a second end 306 thereof. The first end 292 of the intermediate valve rod 290 is configured to mount or couple to the cup-shaped member 286, such as by extending into a cavity 308 thereof, and the second end 298 engages the rod portion 304 of the I/P member 300 through the I/P diaphragm 214.

The supply stack 282 engages a second spring 310 with the first end 288 thereof. So configured, the second spring 310 applies a force on the first end 288 of the supply stack 282 and the I/P diaphragm 214, due to pressure in the second I/P chamber 210, provides a counter force to the second end 306 thereof. By a first approach, controlling the pressure in the second I/P chamber 210 to apply a smaller force on the second end 306 than the spring force causes an annular seat member 312 of the valve seat portion 294 to engage a lip or rim 314 of the supply port 234 to thereby seal the actuator chamber 212 against a supply of pressurized gas from the supply chamber 206. By a similar, second approach, controlling the pressure in the second I/P chamber 210 to apply a larger force on the second end 306 than the spring force causes the annular seat member 312 of the valve seat portion 294 to disengage from the lip 314 of the supply port 234 causing pressurized air from the supply chamber 206 to enter the actuator chamber 212 through the supply port 234.

Figure 5:
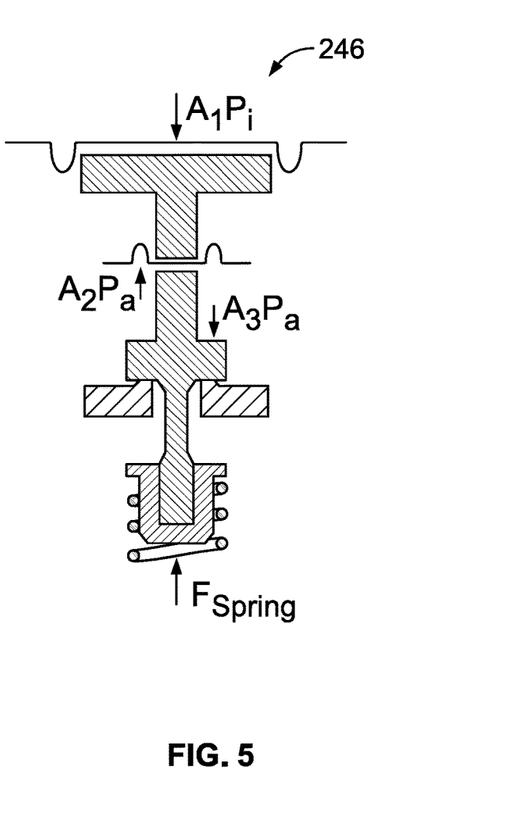
FIG. 5 is a force diagram for an exhaust stack of the relay valve of FIG. 4 in accordance with various embodiments of the present disclosure.

A force diagram for the exhaust stack 246 is shown in FIG. 5. As set forth above, in addition to the forces provided by the first spring 276 and the first portion 243 of the I/P diaphragm 214, a force on the valve seat portion 262 is provided by pressure in the actuator chamber 212. Because the pressure within the actuator chamber 212 can be variable, this force can vary the start point pressures for shifting the exhaust stack 246. Advantageously, the areas for the exhaust port 232 and the first portion 239 of the actuator diaphragm 216 can be generally equal so that the resulting forces cancel one another out.

A force equation showing this relationship for the actuator exhaust stack 246 is as follows:

$$\Sigma F = 0 = -A_1 P_i + A_2 P_a - A_3 P_a + F_{spring}$$

Where $A_1$ is the area of the first portion 243 of the I/P diaphragm 214, $P_i$ is the pressure supplied by the first I/P converter 20a, $A_2$ is the area of the first portion 239 of the actuator diaphragm 216, $P_a$ is the pressure in the actuator chamber 212, $A_3$ is the area of the exhaust port 232, and $F_{spring}$ is the force of the first spring 276.

Manipulating the equation to reflect the value of the pressure supplied by the first I/P converter 20a, the equation becomes:

$$P_i = \frac{A_2 P_a - A_3 P_a + F_{spring}}{A_1}$$

If $A_2 = A_3$, the equation simplifies to:

$$P_i = \frac{F_{spring}}{A_1}.$$

Accordingly, by making the areas of the first portion 239 of the actuator diaphragm 216 and the exhaust port 232 equal, the start point pressure required from the first I/P converter 20a is independent of the pressure in the actuator chamber 206. This means that the start point pressure to exhaust the actuator 1 can be a consistent, known quantity unlike the variable start point pressures of conventional relay valves subject to the oftentimes fluctuating pressures in the actuator. Moreover, this configuration provides consistent deadtime for the operation of the system.

Figure 6:
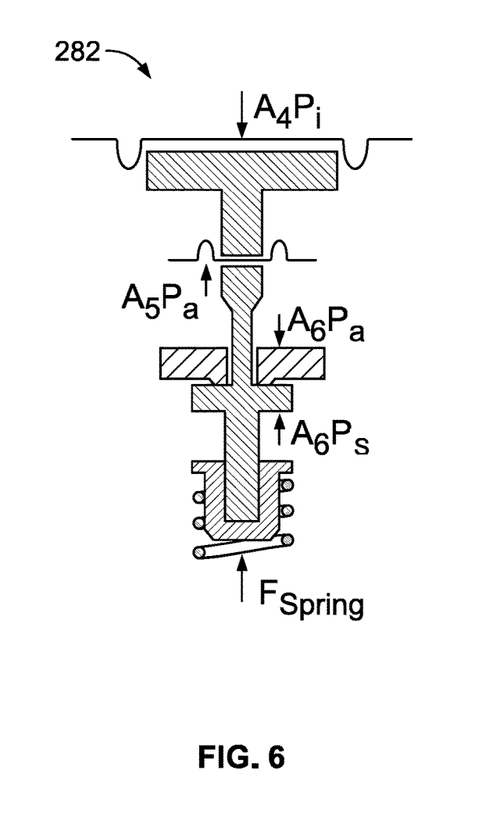
FIG. 6 is a force diagram for a supply stack of the relay valve of FIG. 4 in accordance with various embodiments of the present disclosure.

A force diagram for the supply stack 282 is shown in FIG. 6. As set forth above, in addition to the forces provided by the second spring 310 and the second portion 245 of the I/P diaphragm 214, a force on the valve seat portion 294 is provided by pressure in the actuator chamber 212. Because the pressure within the actuator chamber 212 can be variable, this force can vary the start point pressures for shifting the supply stack 282. Advantageously, the areas for the supply port 234 and the second portion 241 of the actuator diaphragm 216 can be generally equal so that the resulting forces cancel one another out.

A force equation showing this relationship for the supply stack 282, is as follows:

$$\Sigma F = 0 = -A_4 P_i + A_5 P_a - A_6 P_a + A_6 P_s + F_{spring}$$

Where $A_4$ is the area of the second portion 245 I/P diaphragm 214, $P_i$ is the pressure supplied by the second I/P converter 20b, $A_5$ is the area of the second portion 241 of the actuator diaphragm 216, $P_a$ is the pressure in the actuator chamber 212, $A_6$ is the area of the supply port 234, $P_s$ is the pressure in the supply chamber 206, and $F_{spring}$ is the force of the second spring 310.

Manipulating the equation to reflect the value of the pressure supplied by the second I/P converter 20b, the equation becomes:

$$P_i = \frac{A_5 P_a - A_6 P_a + A_6 P_s + F_{spring}}{A_4}.$$

If $A_5=A_6$, the equation simplifies to:

$$P_i = \frac{A_6 P_s + F_{spring}}{A_4}.$$

Accordingly, by making the areas of the second portion 241 of the actuator diaphragm 216 equal to the supply port 234, the start point pressure required from the second I/P converter 20*b* is independent of the pressure in the actuator chamber 206. The force equation is dependent on the pressure in the supply chamber 206. In many cases, however, the pressure in the supply chamber 206 is a known, consistent value. Accordingly, in these cases, the pressure in the supply chamber 206 would have substantially no variable impact on the equation. This means that the start point pressure can be a consistent, known quantity unlike the variable start point pressures of conventional relay valves subject to the oftentimes fluctuating pressures in the actuator. Moreover, this configuration provides consistent deadtime for the operation of the system.

Figure 7:
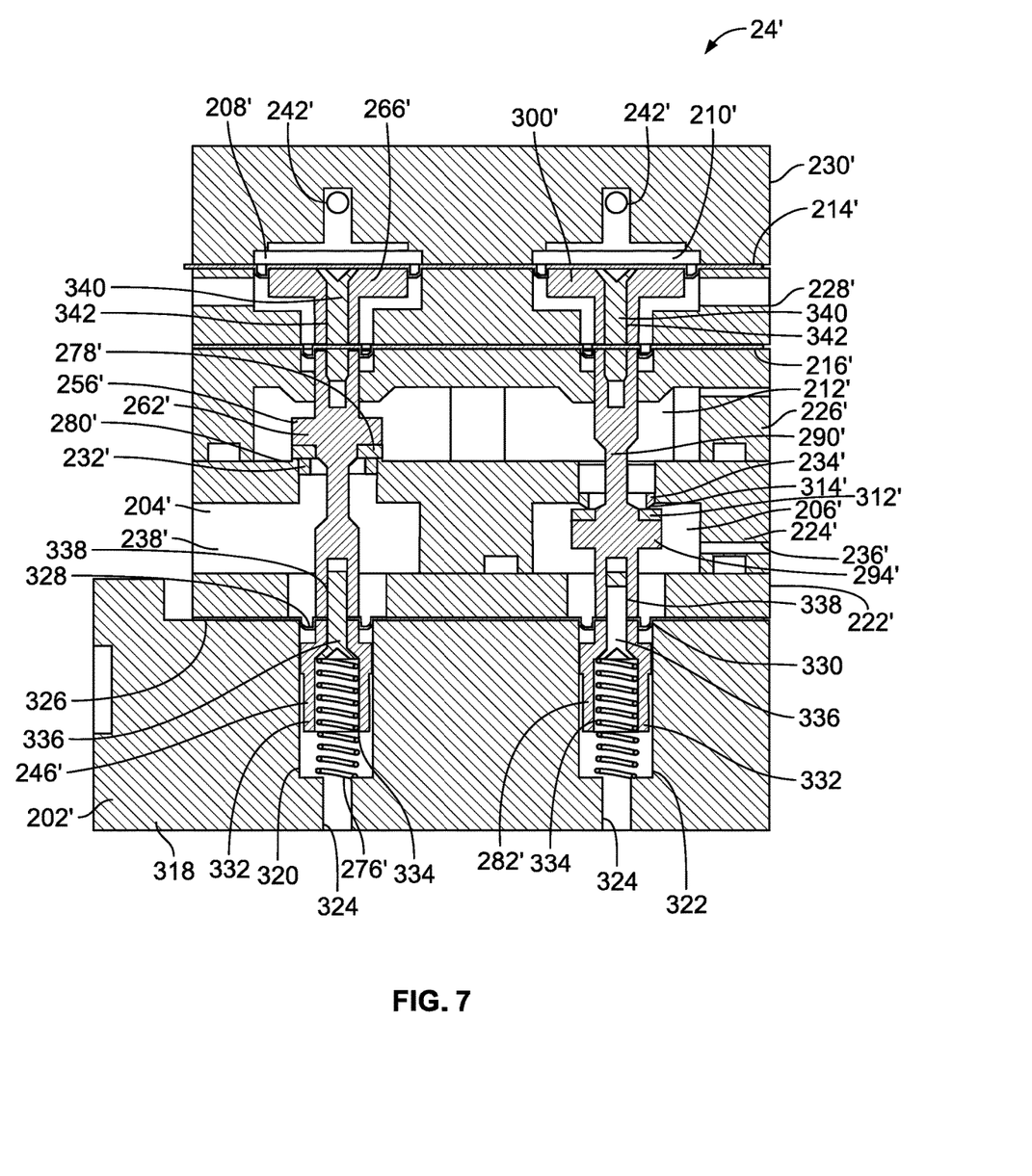
FIG. 7 is a second embodiment of a relay valve in accordance with various embodiments of the present disclosure.

With reference to FIG. 7, a relay valve 24' of a second form is shown. The relay valve 24' includes many of the same components and features as the above relay valve 24. Accordingly, only the differences will be described herein with similar components denoted with a prime.

The housing 202' of this form includes a sixth portion 318 that defines spring chambers 320, 322 for the first and second springs 276', 310', respectively. The spring chambers 320, 322 are open to atmosphere with vents 324. Further, the relay valve 24' includes a supply diaphragm 326 captured between the first and sixth portions 222', 318 of the housing 202'. First and second portions 328, 330 of the supply diaphragm 326 extend across the openings between the spring chambers 320, 322 and the exhaust chamber 204' and supply chamber 206', respectively.

Further, as shown in FIG. 7, the exhaust and supply stacks 246', 282' can include cup-shaped members 332 having cavities 334 with openings at the first ends 254', 288' thereof. The cavities 334 can be sized to receive the first and second springs 276', 310' therein. The cup-shaped members 332 abut the first ends 258', 292' of the intermediate valve rods 256', 290' on either side of the supply diaphragm 326.

Moreover, the components of the exhaust and supply stacks 246', 282' can be secured together through the diaphragms 214', 216', 326. More specifically, threaded fasteners 336 can be inserted into threaded chambers 338 extending from the first ends 254', 288' of the exhaust and supply stacks 246', 282' through the cup-shaped members 332 to the intermediate valve rods 256', 290' thereof. Similarly, threaded fasteners 340 can be inserted into threaded chambers 342 extending from the second ends 264', 298' of the exhaust and supply stacks 246', 282' through the I/P members 266', 300' and into the intermediate valve rods 256', 290' thereof.

Figure 8:
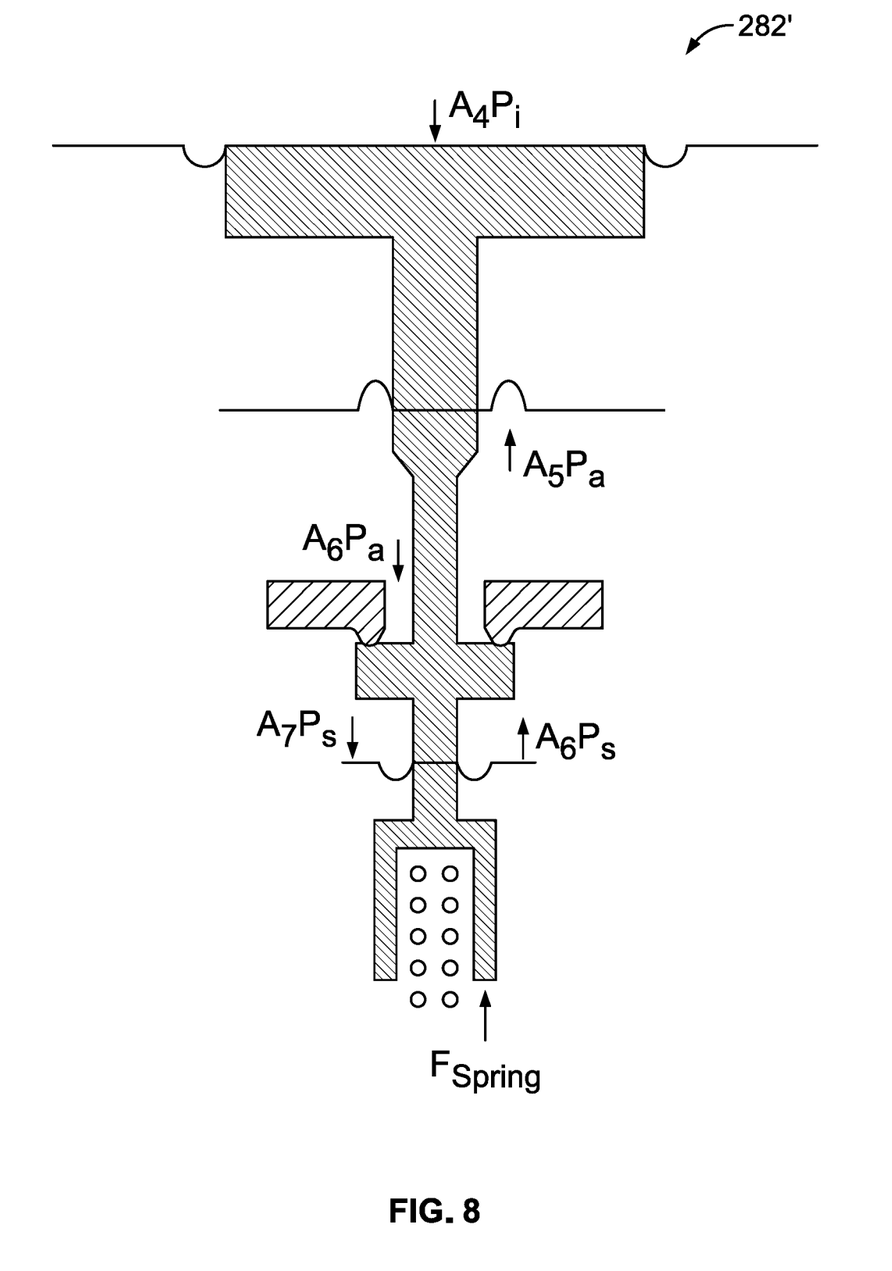
FIG. 8 is a force diagram for a supply stack of the relay valve of FIG. 7 in accordance with various embodiments of the present disclosure.

A force diagram for the exhaust stack 246' of this form is the same as that shown in FIG. 5. A force diagram for the supply stack 282' of this form is shown in FIG. 8. As set forth above, in addition to the forces provided by the second spring 310', the second portion 245 of the I/P diaphragm 214', and the force on the valve seat portion 294' provided by pressure in the actuator chamber 212', the force diagram for this form includes the force provided by the second portion 330 of the supply diaphragm 326. Because the pressure within the actuator and supply chambers 212', 206' can be variable, these forces can vary the start point pressures for shifting the supply stack 282'. Advantageously, the areas for the supply port 234, the second portion 241' of the actuator diaphragm 216', and the second portion 330 of the supply diaphragm 326 can be generally equal so that the resulting forces cancel one another out.

A force equation showing this relationship for the supply stack 282' in this form including the supply diaphragm 326 is as follows:

$$\Sigma F = 0 = -A_4 P_i + A_5 P_a - A_6 P_a + A_6 P_s - A_7 P_s + F_{spring}$$

Where $A_4$ is the area of the second portion 245' of the I/P diaphragm 214', $P_i$ is the pressure supplied by the second I/P converter 20*b*, $A_5$ is the area of the second portion 241' of the actuator diaphragm 216', $P_a$ is the pressure in the actuator chamber 212', $A_6$ is the area of the supply port 234', $P_s$ is the pressure in the supply chamber 206, $A_7$ is the area of the second portion 330 of the supply diaphragm 326, and $F_{spring}$ is the force of the second spring 310.

Manipulating the equation to reflect the value of the pressure supplied by the second I/P converter 20*b*, the equation becomes:

$$P_i = \frac{A_5 P_a - A_6 P_a + A_6 P_s - A_7 P_s + F_{spring}}{A_4}.$$

If $A_5=A_6$ and $A_6=A_7$, the equation simplifies to:

$$P_i = \frac{F_{spring}}{A_4}.$$

Accordingly, by making the areas of the second portion 241' of the actuator diaphragm 216' and the second portion 330 of the supply diaphragm 326 equal to the supply port 234', the start point pressure required from the second I/P converter 20*b* is independent of the pressure in the supply chamber 206 and the actuator chamber 212'. This means that the start point pressure to supply the actuator 1 can be a consistent, known quantity unlike the variable start point pressures of conventional relay valves subject to the oftentimes fluctuating pressures in the actuator chamber 212 and, if applicable, the supply chamber 206. Moreover, this configuration provides consistent deadtime for the operation of the system.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept. For example, although housings are described herein having multi-part constructions, portions thereof can be combined as desired. Further, although single diaphragms are shown with portions thereof coupled to the exhaust and supply stacks, individual diaphragms can be provided for each stack.

What is claimed is:

1. A relay valve comprising:
   a housing including an exhaust chamber, a supply chamber coupled to a supply, an actuator chamber coupled to an actuator, an exhaust port connecting the exhaust chamber to the actuator chamber, a supply port connecting the supply chamber to the actuator chamber, and an I/P chamber coupled to an I/P converter;

a supply stack having a first end, a second end, and a valve seat portion, the supply stack being configured to be shifted within the housing to thereby control opening and closing of the supply port with the valve seat portion thereof;

a spring configured to apply a force on the first end of the supply stack;

an I/P diaphragm mounted within the housing to extend across the I/P chamber, the I/P diaphragm configured to apply a force on the second end of the supply stack based on pressure provided by the I/P converter;

an actuator diaphragm mounted within the housing and coupled to the supply stack, the actuator diaphragm disposed on an opposite side of the actuator chamber as the supply port, wherein an area of the actuator diaphragm is generally equal to an area of the supply port such that forces acting on the supply stack due to pressure within the actuator chamber acting on the valve seat portion and the actuator diaphragm cancel one another out; and a supply diaphragm mounted within the housing and coupled to the supply stack, the supply diaphragm disposed on an opposite side of the supply chamber as the supply port, wherein an area of the supply diaphragm is generally equal to an area of the supply port such that forces acting on the supply stack due to pressure within the actuator chamber acting on the valve seat portion and the actuator diaphragm cancel one another out.

2. The relay valve of claim 1, further comprising an exhaust stack configured to be shifted within the housing to thereby control opening and closing of the exhaust port with the valve seat portion thereof.

3. The relay valve of claim 2, wherein the actuator diaphragm comprises a first actuator diaphragm, the I/P diaphragm comprises a first I/P diaphragm, the spring comprises a first spring; the I/P chamber comprises an I/P supply chamber; and the housing further comprises an I/P exhaust chamber coupled to an exhaust I/P converter; and further comprising:
a second spring configured to apply a force on the first end of the exhaust stack;
a second I/P diaphragm mounted within the housing to extend across the exhaust I/P chamber, the second I/P diaphragm configured to apply a force on the second end of the exhaust stack based on pressure provided by the exhaust I/P converter; and
a second actuator diaphragm mounted within the housing and coupled to the exhaust stack, the second actuator diaphragm disposed on an opposite side of the actuator chamber as the exhaust port.

4. The relay valve of claim 3, wherein the first and second actuator diaphragms comprise portions of a single diaphragm.

5. The relay valve of claim 3, wherein the first and second I/P diaphragms comprise portions of a single diaphragm.

6. The relay valve of claim 1, wherein the supply stack comprises an I/P member disposed within the I/P chamber of the housing and a valve rod member having a first end, a second end, and the valve seat portion, wherein the second end of the valve rod and the I/P member engage one another on either side of the I/P diaphragm.

7. The relay valve of claim 6, wherein the I/P member and the valve rod member are secured together through the I/P diaphragm using a fastener.

8. The relay valve of claim 1, wherein the housing has a multi-part construction defining the exhaust chamber, supply chamber, actuator chamber, and I/P chamber between portions thereof.

9. A relay valve comprising:
a housing including an exhaust chamber, a supply chamber coupled to a supply, an actuator chamber coupled to an actuator, an exhaust port connecting the exhaust chamber to the actuator chamber, and a supply port connecting the supply chamber to the actuator chamber;

an exhaust stack having a first end, a second end, and a valve seat portion, the stack being configured to be shifted within the housing to thereby control opening and closing of the exhaust port with the valve seat portion thereof;

a supply stack having a valve seat portion and being configured to be shifted within the housing to thereby control opening and closing of the supply port with the valve seat portion thereof;

a first actuator diaphragm mounted within the housing and coupled to the exhaust stack, the first actuator diaphragm disposed on an opposite side of the actuator chamber as the exhaust port, wherein an area of the first actuator diaphragm is generally equal to an area of the exhaust port such that forces acting on the exhaust stack due to pressure within the actuator chamber acting on the valve seat portion and the first actuator diaphragm cancel one another out;

a second actuator diaphragm mounted within the housing and coupled to the supply stack, the second actuator diaphragm disposed on an opposite side of the actuator chamber as the supply port, wherein an area of the second actuator diaphragm is generally equal to an area of the supply port such that forces acting on the supply stack due to pressure within the actuator chamber acting on the valve seat portion and the second actuator diaphragm cancel one another out; and a supply diaphragm mounted within the housing and coupled to the supply stack, the supply diaphragm disposed on an opposite side of the supply chamber as the supply port, wherein an area of the supply diaphragm is generally equal to an area of the supply port such that forces acting on the supply stack due to pressure within the supply chamber acting on the valve seat portion and the supply diaphragm cancel one another out.

10. The relay valve of claim 9, wherein the first actuator diaphragm and the second actuator diaphragm comprise portions of a single diaphragm.

11. The relay valve of claim 9, wherein the exhaust and supply stacks include upper and lower members disposed on either side of the first and second actuator diaphragms, respectively.

12. The relay valve of claim 11, wherein the upper and lower members of the exhaust and supply stacks are secured together through the first and second actuator diaphragms, respectively.

13. The relay valve of claim 9, wherein the housing includes first and second I/P chambers coupled to first and second I/P converters, the second ends of the exhaust and supply stacks being disposed within the first and second I/P chambers, and further comprising:

an I/P diaphragm including first and second portions extending across the first and second I/P chambers, the first and second portions configured to apply a force on the second ends of the exhaust and supply stacks, respectively, based on pressure provided by the respective I/P converter;

a first spring disposed within the housing and configured to apply a force on the first end of the exhaust stack; and a second spring disposed within the housing and configured to apply a force on the first end of the supply stack.

14. A system including the relay valve of claim 1, and further comprising:

first and second I/P converters coupled to the relay valve; and an actuator coupled to the relay valve.

15. The system of claim 14, further comprising a controller coupled to the first and second I/P converters and configured to receive feedback from the actuator.

16. A method for operating a relay valve having a housing including an exhaust chamber, a supply chamber coupled to a supply, an actuator chamber coupled to an actuator, an exhaust port connecting the exhaust chamber to the actuator chamber, a supply port connecting the supply chamber to the actuator chamber, and an I/P chamber coupled to an I/P converter, the method comprising:

applying a first force on a first end of a supply stack disposed within the housing and configured to be shifted therein to thereby control opening and closing of the supply port with a valve seat portion thereof;

applying a second force on the valve seat portion of the supply stack based on pressure within the actuator chamber;

applying a third force on the supply stack having a magnitude generally equal to the second force in an opposite direction thereof with an actuator diaphragm disposed across a portion of the actuator chamber to thereby negate the impact of the second force on the supply stack;

receiving an input pressure from the I/P converter in the I/P chamber;

applying a fourth force on a second end of the supply stack with an I/P diaphragm disposed across the I/P chamber based on the input pressure to thereby control shifting of the supply stack;

applying a fifth force on the valve seat portion of the supply stack based on pressure within the supply chamber; and applying a sixth force on the supply stack having a magnitude generally equal to the fifth force in an opposite direction thereof with a supply diaphragm disposed across a portion of the supply chamber to thereby negate the impact of the fifth force on the supply stack.

17. The method of claim 16, wherein applying the first force comprises applying the first force on the first end of the supply stack with a spring.

18. The method of claim 16, wherein the I/P chamber comprises a first I/P chamber, the actuator diaphragm comprises a first actuator diaphragm, and the housing further includes a second I/P chamber coupled to a second I/P converter; and further comprising applying a first force on a first end of an exhaust stack disposed within the housing and configured to be shifted therein to thereby control opening and closing of the exhaust port with a valve seat portion thereof;

applying a second force on the valve seat portion of the exhaust stack based on pressure within the actuator chamber;

applying a third force on exhaust stack having a magnitude generally equal to the second force in an opposite direction thereof with a second actuator diaphragm disposed across a portion of the actuator chamber to thereby negate the impact of the second force on the exhaust stack;

receiving an input pressure from the second I/P converter in the second I/P chamber;

applying a fourth force on a second end of the exhaust stack with a second I/P diaphragm disposed across the second I/P chamber based on the input pressure from the second I/P converter to thereby control shifting of the supply exhaust stack.

* * * * *

UNITED STATES PATENT AND TRADEMARK OFFICE
CERTIFICATE OF CORRECTION

PATENT NO. : 10,802,510 B2
APPLICATION NO. : 16/146379
DATED : October 13, 2020
INVENTOR(S) : Christopher S. Metschke It is certified that error appears in the above-identified patent and that said Letters Patent is hereby corrected as shown below:

In the Specification

At Column 2, Line 3, "stack." should be -- stack, --.

At Column 5, Line 26, "may" should be -- may be --.

At Column 5, Line 42, "An" should be -- A/An --.

At Column 7, Line 55, "0" should be -- $i)$ --.

In the Claims

At Column 16, Line 20, "comprising" should be -- comprising: --.

At Column 16, Line 28, "on" should be -- on the --.

At Column 16, Line 40, "the supply" should be -- the --.

Signed and Sealed this
Twenty-ninth Day of June, 2021

Drew Hirshfeld
*Performing the Functions and Duties of the*
*Under Secretary of Commerce for Intellectual Property and*
*Director of the United States Patent and Trademark Office*